(12) United States Patent
Hobro

(10) Patent No.: US 10,956,225 B2
(45) Date of Patent: Mar. 23, 2021

(54) SCALABLE COMPUTATION AND COMMUNICATION METHODS FOR DOMAIN DECOMPOSITION OF LARGE-SCALE NUMERICAL SIMULATIONS

(71) Applicant: SCHLUMBERGER TECHNOLOGY CORPORATION, Sugar Land, TX (US)

(72) Inventor: James William Douglas Hobro, Cambridge (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 169 days.

(21) Appl. No.: 15/876,374

(22) Filed: Jan. 22, 2018

(65) Prior Publication Data

US 2018/0217873 A1 Aug. 2, 2018

Related U.S. Application Data

(60) Provisional application No. 62/449,005, filed on Jan. 21, 2017.

(51) Int. Cl.
*G06F 9/50* (2006.01)
*G06F 9/54* (2006.01)
(Continued)

(52) U.S. Cl.
CPC ............ *G06F 9/5077* (2013.01); *G01V 1/282* (2013.01); *G06F 9/5027* (2013.01);
(Continued)

(58) Field of Classification Search
CPC ...... G06F 9/5077; G06F 9/5027; G06F 9/546; G06F 9/5066; G01V 1/282; G01V 2210/679
See application file for complete search history.

(56) References Cited

U.S. PATENT DOCUMENTS

| 5,774,693 A | 6/1998 | Hsu et al. |
| 2011/0107345 A1* | 5/2011 | Al-kadi ................. G06F 9/4881 718/106 |

(Continued)

FOREIGN PATENT DOCUMENTS

| EP | 2811112 A2 | 12/2014 |
| WO | 2015009361 A2 | 1/2015 |

OTHER PUBLICATIONS

Uhlherr, Alfred. Parallel Monte Carlo simulations by asynchronous domain decomposition. Available online at www.sciencedirect.com. Received Mar. 25, 2003. Accessed Oct. 4, 2019. (Year: 2003).*

(Continued)

*Primary Examiner* — Meng Ai T An
*Assistant Examiner* — Michael W Ayers

(57) ABSTRACT

The present disclosure provides systems and methods for domain decomposition in parallel numerical computer modelling that remove the need for large-scale synchronization, decouple the regions within a simulation, and reduces wait times, increasing linear scalability and thus suitability for large-scale cloud deployment. Presently disclosed systems and methods include asynchronous message passing which decouples the computational units within the system and introduces an elasticity that allows wait time to be largely eliminated. Applications include domains in which computations are not easily parallelized and/or large-scale numerical simulations used with a large cluster or cloud computing facility.

15 Claims, 6 Drawing Sheets

(51) Int. Cl.
G06F 1/28 (2006.01)
G01V 1/28 (2006.01)
(52) U.S. Cl.
CPC ............ *G06F 9/5066* (2013.01); *G06F 9/546* (2013.01); *G01V 2210/679* (2013.01)

(56) References Cited

U.S. PATENT DOCUMENTS

| | | | |
|---|---|---|---|
| 2012/0079490 A1* | 3/2012 | Bond | G06F 9/5038 718/103 |
| 2012/0131592 A1* | 5/2012 | Kim | G06F 9/5027 718/104 |
| 2012/0254966 A1* | 10/2012 | Parker | G06F 9/5027 726/7 |
| 2013/0060544 A1 | 3/2013 | Bakker et al. | |
| 2013/0167151 A1* | 6/2013 | Verma | G06F 9/5066 718/102 |
| 2013/0246030 A1 | 9/2013 | Usadi et al. | |
| 2013/0325419 A1* | 12/2013 | Al-Shaikh | G06F 9/5066 703/2 |
| 2015/0178125 A1* | 6/2015 | van der Lugt | G06F 9/4881 718/102 |
| 2015/0331964 A1* | 11/2015 | Hobro | H04L 47/125 709/226 |
| 2016/0077867 A1* | 3/2016 | Falco | G06F 9/3009 718/101 |
| 2016/0162613 A1 | 6/2016 | Shevchenko et al. | |
| 2016/0239591 A1* | 8/2016 | Sampath | G01V 99/005 |

OTHER PUBLICATIONS

Szpindler, Maciej. "Scalable Remote Memory Access Halo Exchange with Reduced Synchronization Cost." Cray User Group Proceedings 2016. (Year: 2016).*

Holewinski, Justin et al. "High-Performance Code Generation for Stencil Computations on GPU Architectures." Department of Computer Science and Engineering, The Ohio State University. ICS' 12, Jun. 25-29, 2012 (Year: 2012).*

Khanyile, Nontokozo et al. "An Analytic Model for Predicting the Performance of Distributed Applications on Multicore Clusters." IAENG International Journal of Computer Science, 39:3 IJCS_39_3_11. Available Aug. 28, 2012 (Year: 2012).*

"FRTM—Asynchronous Constraint Execution for Scalability and Heterogeneity on Shot Level", downloaded from http://rice2015oghpc.blogs.rice.edu/files/2015/03/Parallel-A-Session-1-RTM.pdf on Feb. 22, 2019, 15 pages.

Zelin, L. et al., "A hazard analysis via an improved timed colored petri net with time-space coupling safety constraint", Chinese Journal of Aeronautics, 2016, 29(4), pp. 1027-1041.

International Search Report and Written Opinion issued in International Patent Application No. PCT/US2018/014623 dated May 10, 2018, 13 pages.

International Preliminary Report on Patentability issued in International Patent Application No. PCT/US2018/014623 dated Aug. 1, 2019, 12 pages.

Fraunhofer ITWM, "Seismic Depth Migration RTM", downloaded from http://www.itwm.fraunhofer.de/en/departments/hpc/seismic-imaging/3d-rtm.html; reviewed Sep. 2016, 3 pages.

* cited by examiner

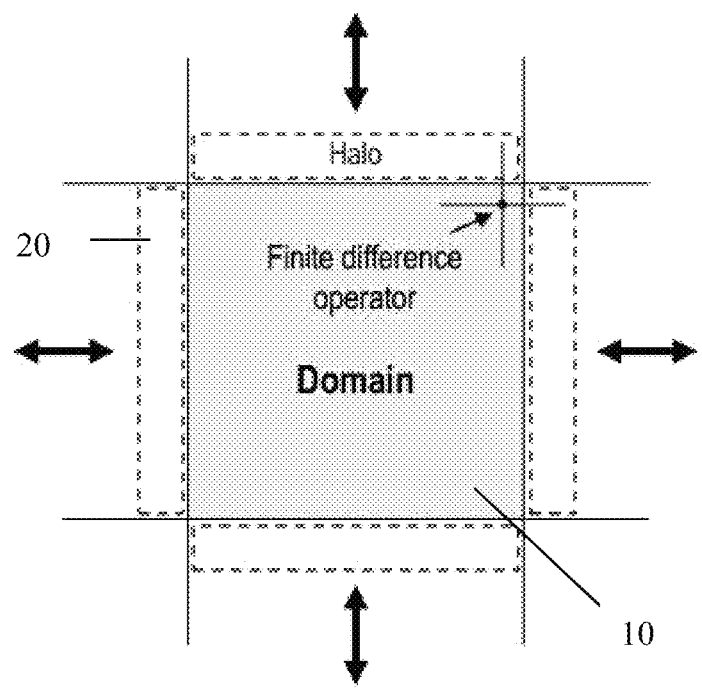
FIG. 1A
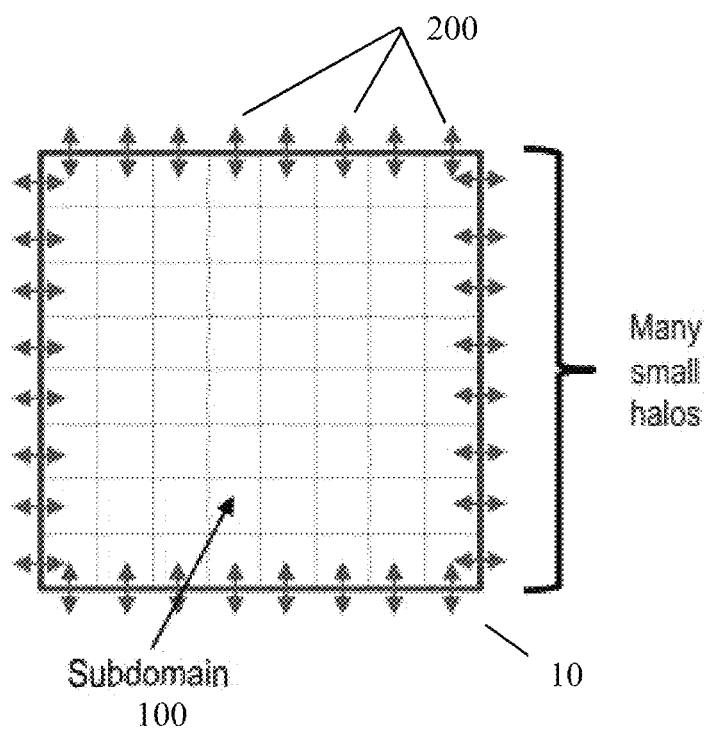
FIG. 1B
FIGURE 1

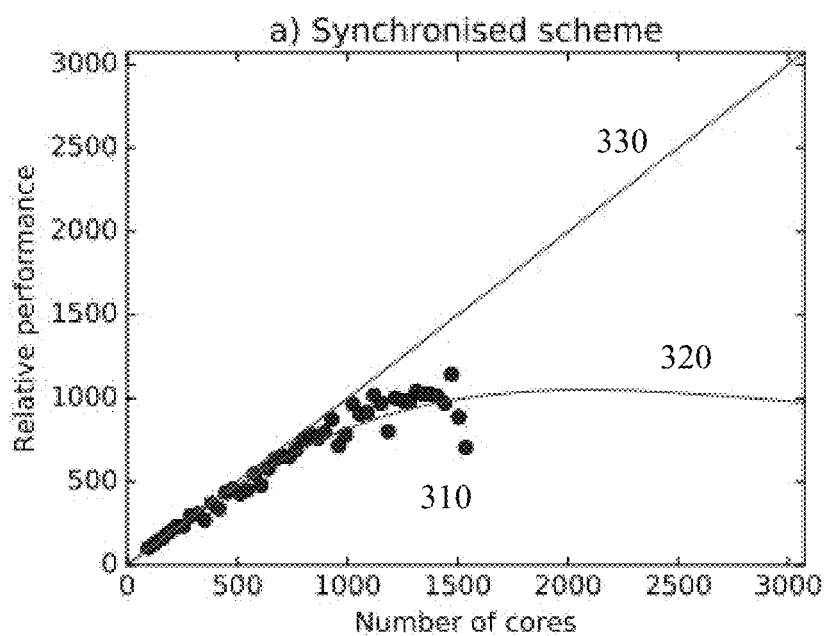
FIG. 6A
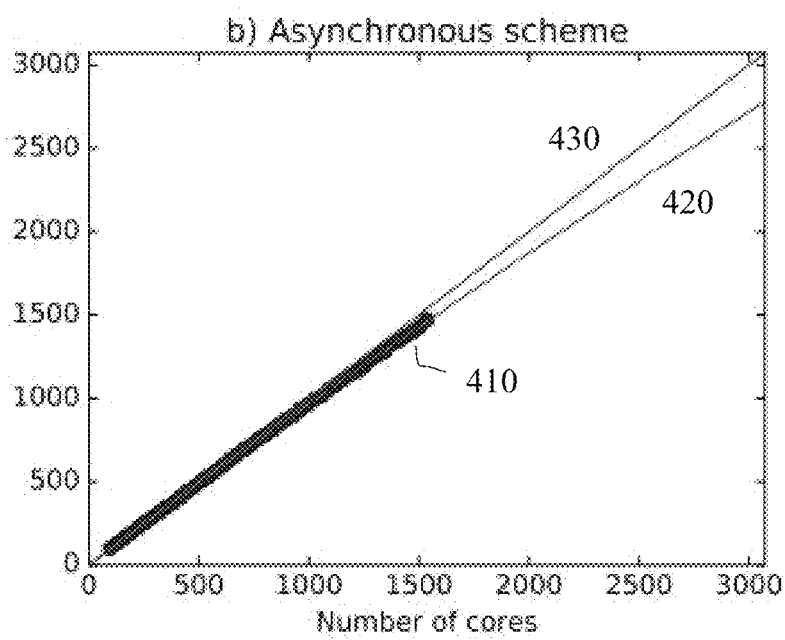
FIG. 6B
FIGURE 6

SCALABLE COMPUTATION AND COMMUNICATION METHODS FOR DOMAIN DECOMPOSITION OF LARGE-SCALE NUMERICAL SIMULATIONS

CROSS-REFERENCE TO RELATED APPLICATION

This application claims the benefit of U.S. Provisional Application No. 62/449,005, filed Jan. 21, 2017.

BACKGROUND

This section is intended to introduce the reader to various aspects of art that may be related to various aspects of the presently described embodiments. This discussion is believed to be helpful in providing the reader with background information to facilitate a better understanding of the various aspects of the described embodiments. Accordingly, it should be understood that these statements are to be read in this light and not as admissions of prior art.

This disclosure relates to the computer simulation of physical objects and their interactions. Computer simulation is essential to many new developments in science and technology. Many physical systems or objects and their interactions are simulated by computers rather than studied by physical experiments due to various considerations. For example, in nuclear weapon design and testing, nuclear device detonation is banned by international treaties. To test the function, safety or effectiveness of a nuclear device, detonations are simulated by computers. In numerical weather forecasting, by definition, the forecast must be predicted before the weather condition actually occurs. The progression of weather changes is simulated by numerical computer simulations. In oil and gas exploration, seismic surveys are conducted to find possible oil and gas reservoirs. The resulting seismic survey data are enormous in both quantity and complexity. To understand the data, which can reveal the interactions of seismic waves and the underlying Earth structures, computer simulations are used.

Computer simulations based on large-scale numerical modelling have played a pivotal role in geosciences applications, for example, in seismic wave equation modelling, which forms the core computational engine in velocity model building and imaging components such as full waveform inversion and reverse time migration. As larger computing resources have become available at ever-decreasing cost, numerical modelling applications have been pushed to greater limits of scale, resolution and accuracy. In the case of seismic wave equation modelling, for example, the transitions from isotropic to anisotropic modelling and from acoustic to elastic and viscoelastic modeling have worked in conjunction with the demands for larger-scale simulations to create modelling tasks of a magnitude that can only be solved using large-scale parallel computing resources.

Parallel computing is widely used for large scale simulation of complex systems, some of which are mentioned above. Many applications require numerical modelling to be performed independently for a large number of scenarios, for example modelling multiple seismic shots for a reverse time migration. From the point of view of scalability, these cases are embarrassingly parallel and can be scaled up relatively easily to match the available resources. However, some numerical modelling problems, for example the modelling of waves from a single seismic event in complex media or the large-scale modelling of plane waves, are more tightly coupled. Accordingly, distributing these problems successfully over large-scale parallel computing resources is much more challenging.

The availability of computing resources through cloud services has opened up new opportunities for numerical modelling due to the flexibility with which different sizes and configurations of hardware can be accessed as a back-end system. While this presents an enabling technology for intensive numerical tasks such as rapid modelling in interactive applications, these opportunities rely increasingly on the availability of numerical modelling algorithms that scale well over large parallel systems.

The distribution of numerical modelling problems over parallel resources traditionally has been approached using technologies such as the Message Passing Interface (MPI) for distribution across many blades or computations units, and Open Multi-Processing (OpenMP) for distribution across cores within computational units. These technologies provide simple and accessible synchronization operations for communication between nodes in a parallel system, allowing algorithms to be written in a traditional sequential form. This provides an easy route to parallel computing, but tends to lead to systems that are highly synchronized, with synchronization often occurring at relatively small time intervals (e.g. at every time step in a time stepping scheme). For example, finite-difference modelling methods synchronize domains at each modelling time step, and other solutions similarly implement tight synchronization between domains. These approaches limit the scalability, the size of simulation that can be attempted, and the degree to which cost-effective simulations can be accelerated by increasing the computing resources available.

Linear scalability (gaining extra throughput in proportion to the extra resources added to the system) is not well attained with such traditional systems because computational units are forced to spend some of their time waiting rather than computing. The two main causes of such poor scalability are contention and/or incoherency. Contention occurs when there is competition between units for a restricted shared resource (e.g. access by multiple CPU cores to shared memory), which typically leads to diminishing returns where the addition of new resources can only bring the system's computing capacity asymptotically towards a limit imposed by the constrained shared resource. Incoherency results from the requirement of some or all components to synchronize state, perhaps frequently. This leads first to diminishing returns and then eventually to negative returns, where the addition of new resources actually degrades performance. The conventional sequential approach to programming parallel numerical modelling algorithms thus is limited in its scalability when significant synchronization across the parallel computing system is required and therefore poorly suited to large-scale cloud deployment.

BRIEF DESCRIPTION OF THE DRAWINGS

For a detailed description of embodiments of the present disclosure, reference will now be made to the accompanying drawings in which:

FIGS. 1A and 1B schematically illustrate a comparison of a conventional synchronized large-scale exchange between large domains (FIG. 1A) and an asynchronous stream of small-scale computation and exchange across many subdomains in accordance with one or more embodiments of the present disclosure (FIG. 1B);

FIGS. 6A and 6B illustrate a comparison of exemplary performance results for a conventional synchronized domain decomposition and an asynchronous method in accordance with one or more embodiments of the present disclosure.

DETAILED DESCRIPTION

Figure 2:
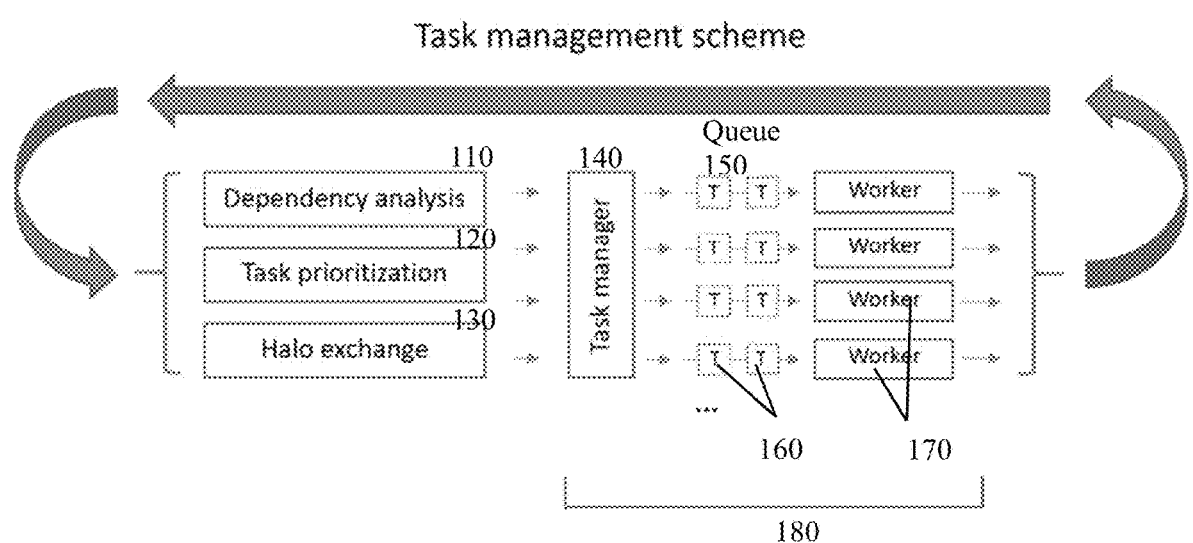
FIG. 2 schematically illustrates a scalable computation and communication method for large-scale numerical simulation in accordance with one or more embodiments of the present disclosure.

Reference will now be made in detail to embodiments, examples of which are illustrated in the accompanying drawings and figures. In the following detailed description, numerous specific details are set forth in order to provide a thorough understanding of the subject matter herein. However, it will be apparent to one of ordinary skill in the art that the subject matter may be practiced without these specific details. In other instances, well-known methods, procedures, components, and systems have not been described in detail so as not to unnecessarily obscure aspects of the embodiments.

This discussion is directed to various embodiments of the disclosure. The drawing figures are not necessarily to scale. Certain features of the embodiments may be shown exaggerated in scale or in somewhat schematic form, and some details of conventional elements may not be shown in the interest of clarity and conciseness. Although one or more of these embodiments may be preferred, the embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to intimate that the scope of the disclosure, including the claims, is limited to that embodiment.

The terminology used in the description of the disclosure herein is for the purpose of describing particular embodiments only and is not intended to be limiting of the subject matter. When introducing elements of various embodiments of the present disclosure and claims, the articles "a," "an," "the," and "said" are intended to mean that there are one or more of the elements. The term "and/or" as used herein refers to and encompasses any and all possible combinations of one or more of the associated listed items. The terms "comprising," "including," and "having" are used in an open-ended fashion, and thus should be interpreted to mean "including, but not limited to . . . ."

As used herein, the term "if" may be construed to mean "when" or "upon" or "in response to determining" or "in response to detecting," depending on the context. Similarly, the phrase "if it is determined" or "if (a stated condition or event) is detected" may be construed to mean "upon determining" or "in response to determining" or "upon detecting (the stated condition or event)" or "in response to detecting (the stated condition or event)," depending on the context.

Also, it is noted that embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine-readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine-readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Certain terms are used throughout the description and claims to refer to particular features or components. As one skilled in the art will appreciate, different persons may refer to the same feature or component by different names. This document does not intend to distinguish between components or features that differ in name but not function, unless specifically stated.

Embodiments of the present disclosure are directed to scalable computation and communication methods and systems for domain decomposition such that computational tasks among available computer nodes are distributed asynchronously for increased speed of completion. The scalable methods and systems of the present disclosure are described for computer simulations for seismic surveys, but the methods are not limited to computer simulations for seismic surveys. Any computer simulation for 2D, 3D or higher-dimensional systems may use the methods and/or systems described below.

The present disclosure presents an alternative approach to the conventional sequential design for parallel numerical modelling to improve the scalability of the simulation by reducing or removing the contention and incoherency caused by the synchronized communication model inherent in sequential designs. The methods of the present disclosure include asynchronous message passing (AMP) which decouples the computational units within the system and introduces an elasticity that allows wait time to be largely eliminated. While the present disclosure is described by way of non-limiting example in the context of seismic modelling, it is equally applicable to other domains in which computations are not easily parallelized, applications involving large-scale numerical simulations, and/or large-scale numerical simulations involving use in conjunction with a large cluster or cloud computing facility.

The scalable computation and communication methods for domain decomposition of large-scale numerical simulations of the present disclosure allow a much larger degree of scalability in simulations than was previously possible by avoiding tight synchronization between domains. In particular, the scalable methods and systems of the present disclosure allow numerical simulations (including finite-difference simulations) to be performed efficiently when distributed over very large compute clusters using domain decomposition. In the conventional domain decomposition approach, communication between domains is highly synchronized and this limits the scalability of the process for large clusters (by today's standards) and in cloud deployment. This new approach uses a two-tier decomposition scheme and a new, asynchronous communication model that vastly reduces the synchronization between domains. It breaks the simulation down into a large number of small tasks with a substantial degree of freedom in the order in which they may be solved. This replaces tight coupling between large domains in the system with loose coupling between many small pairs of subdomains that cross the domain boundaries. As a result, the communication between domains occurs in many small packets that are evenly spread out in time. This reduces network contention compared with the conventional model in which in communication occurs in synchronized bursts, which create high contention. The overall result of these characteristics is that a simulation may be run efficiently on much larger compute clusters.

This increase in scalability allows simulations to be run on a larger scale than was possible previously. It also allows simulations that are large by today's standards, but still feasible, to be run on significantly larger compute resources in a much shorter time. When combined with the large increase in cluster size possible with cloud computing, this opens up new applications for real-time modelling or interactive modelling applications.

The present disclosure can be used in numerical modelling applications across many domains, for example, seismic modelling related to oil and gas exploration. In this context, finite-difference modelling is often used at the core of commercial large-scale algorithms in the seismic imaging workflow, in particular, in reverse-time migration and full waveform inversion. While the present disclosure is described in the context of finite difference methods for solving complex problems (e.g. partial differential equations), it can also be used in computer simulations using finite elements, spectral elements and many other methods. The present disclosure may but need not be used in conjunction with the load balancing methods described in U.S. Patent Publication No. 2015/033196. Further, the methods of the present disclosure can be used in any application of finite-difference modelling in which individual large simulations are required, for example, geophysical applications inside and outside of the oil and gas industry, electromagnetic field modelling for various applications, heat equation modelling for various applications, and the like. The methods of the present disclosure also can be used to create elastic wave-equation modelling for seismic imaging and full waveform inversion, reservoir-to-surface wave-equation microseismic modelling, and/or interactive tools for modelling-assisted Earth model building, for example.

Referring now to FIG. 1, a schematic comparison of a conventional synchronized large-scale halo exchange between large domains 10 (FIG. 1A) and the stream of small-scale computation and exchange across many subdomains 100 of the present disclosure (FIG. 1B) is shown. In the conventional method of FIG. 1A, when the domain decomposition approach is applied to time-stepping modelling algorithms, the overall modelling domain is split into smaller domains 100 that are mapped to physical computational units, for example, blades within a compute cluster. Communication between domains occurs at each time or other simulation step, with the exchange of halos (arrows) 20 containing the results from a given domain 10 that are required by its neighbors to continue the computation. This introduces tight synchronization between neighboring domains (not shown) since the entire domain 10 is prevented from computing the next time step until it has obtained the halos it requires from its neighbors. The effect of this large-scale synchronization, which is not inherent in the problem and is a matter of programming convenience, is typically reduced by staged computation where computation in the outer regions of a domain 10 is performed first and the results broadcast to neighboring domains (not shown) to allow the inner region computation to be performed while halos (arrows) 20 are transmitted across the cluster network.

In contrast, as shown in FIG. 1B, the methods of the present disclosure include a multi-tier (at least two-tier) decomposition scheme for decoupling. In the example shown, each domain 10 is split into many smaller subdomains 100, and each subdomain 100 may advance by one simulation (e.g., time) step with respect to its neighbors. This introduces considerable freedom or slack in the possible computation order for the simulation. Exchange of halos (arrows) 200 occurs between individual subdomains 100 rather than whole domains 10, which generates a continuous stream of network traffic rather than a succession of bursts, reducing the scope for network contention.

The methods of the present disclosure are adapted to hardware and require hardware to run. Such hardware may include, for example, a first tier of blades or large-scale computational units and a second tier of cores, secondary processing units, co-processors, or any processing unit controlled from within a blade, or any other combination of computer and/or processing hardware. The computational resources within each blade (or large-scale computational unit) could comprise individual CPUs or GPUs, small clusters of specialist CPUs or GPUs, FPGAs, or an alternative form of hardware capable of solving a region of the modelling problem.

Referring now to FIG. 2, a schematic illustration of a scalable computation and communication method for large-scale numerical simulation in accordance with one or more embodiments of the present disclosure is shown. In the depicted operational set-up, tasks are dispatched to multiple workers asynchronously by a task manager, using information supplied by computation 110 including for example dependency analysis, task prioritization 120, and halo exchange 130 e.g. input/output (I/O) schemes. Tasks 160 (also denoted as "T" in FIG. 2) involving computation 110, prioritization 120, halo exchange 130, and other tasks e.g. management of sources and receivers, are all scheduled and performed dynamically by actors in the system that communicate entirely via asynchronous message queues 150. Units of computation, exchange, and I/O are assigned by the task manager 140 as tasks 160 to workers 170 via the asynchronous message queues 150. This maximizes the backlog of computation available for each computational unit before it is necessary to wait, allowing most system delays due to time sharing or network traffic to be absorbed rather than accumulating as idle time. The subdomains 100 are large enough to allow efficient movement of data, but small enough to provide substantial flexibility in the order of computation. The approach of the present disclosure thus replaces tight coupling between large domains 10 in the system (FIG. 1A) with loose coupling between many small pairs of subdomains 100 that cross the domain boundaries (FIG. 1B).

In particular, embodiments of the present disclosure comprise a multi-tier domain decomposition in which the complete modelling domain is divided into domains 10 with each domain further divided into subdomains 100, and a mapping between this decomposition and a compute cluster architecture, in which domains 10 are mapped to computer blades connected with: relatively high latency, large-scale computational units; computer nodes; processors; processor cores; one or more processors attached to co-processors which may be different in nature (e.g. a CPU host processor and GPU co-processor); or the like; and/or any combination thereof. In this approach, modelling on each domain's 10 subdomains 100 is performed using the multiple computational resources (e.g. CPU or GPU cores) within the corresponding blade. While two tiers are shown, the domain decomposition may include further decomposition into additional i.e. any number of tiers.

The task dependency analysis scheme 110 tracks the dependency relationship between tasks and can determine which tasks 160 may be executed at any given time; the task prioritization scheme 120 determines the order in which the available tasks 160 at any given time should be processed; and the exchange scheme 130 manages the asynchronous exchange of information between subdomains 100 (FIG. 1B) and their neighbors in different domains 10. The task manager or scheduling component 140 coordinates these parts of the system, feeding computational tasks 160 to the task or asynchronous messaging queue 150 from a list of available tasks supplied by the dependency analysis 110. The task prioritization scheme 120 determines the order in which the available tasks 160 are added to the task farm 180, i.e., collection of tasks 160. Each task 160 represents a unit of computation within a single subdomain 100, for example, the solution of a single step in a time-stepping scheme.

The task farm 180 manages the mapping of computational tasks 160 applied to subdomains 100 (FIG. 1B) to the computational resources available within each blade or other physical computational unit, i.e. is used to divide work between multiple workers 170. The asynchronous queue 150 assigns or dispatches tasks 160 to the workers 170 and processes their results asynchronously. In the context of finite difference modelling, a task farm 180 may refer to any one or more, or all, of the components 140, 150, 160, and/or 170 previously described, e.g. the task manager 140 and the queues 150 and workers 170 it is managing. The workers 170 represent smaller processing units within the computational unit and can be physical or virtual (i.e. processes managed by the operating system software and assigned by it, perhaps dynamically, to physical cores or processors). They might be in any part of the blade/computational unit (in any processor or co-processor within it).

The task dependency analysis scheme 110 in embodiments of the present disclosure provides system stability by ensuring that the prerequisites for each task 160 are met before the task is assigned to a worker 170, and ensuring that no task 160 is begun that would prevent another task 160 from running correctly. Thus the use of the task dependency analysis scheme 110 of the present disclosure, described further with reference to FIG. 3 below, ensures that tasks 160 are executed in an order that maintains the stability of the system. The task dependency analysis 110 may use a dependency graph or equivalent structure to perform its analysis, which may be updated dynamically during the course of the computation.

The exchange 130 across domain 10 boundaries or halos 200 at the fine granularity of the subdomains 100 of present embodiments (exchange being conventionally handled for entire domain boundaries via halos 20) plays a key role in reducing the level of synchronization between domains 10, thereby improving the scalability of the system.

The task prioritization scheme 120 in embodiments of the present disclosure reduces synchronization between domains 10 by maximizing the amount of 'slack' available to each domain 10 to continue processing tasks 160 before the domain is forced to wait for results from neighboring domains, thereby improving the scalability of the system.

Figure 3:
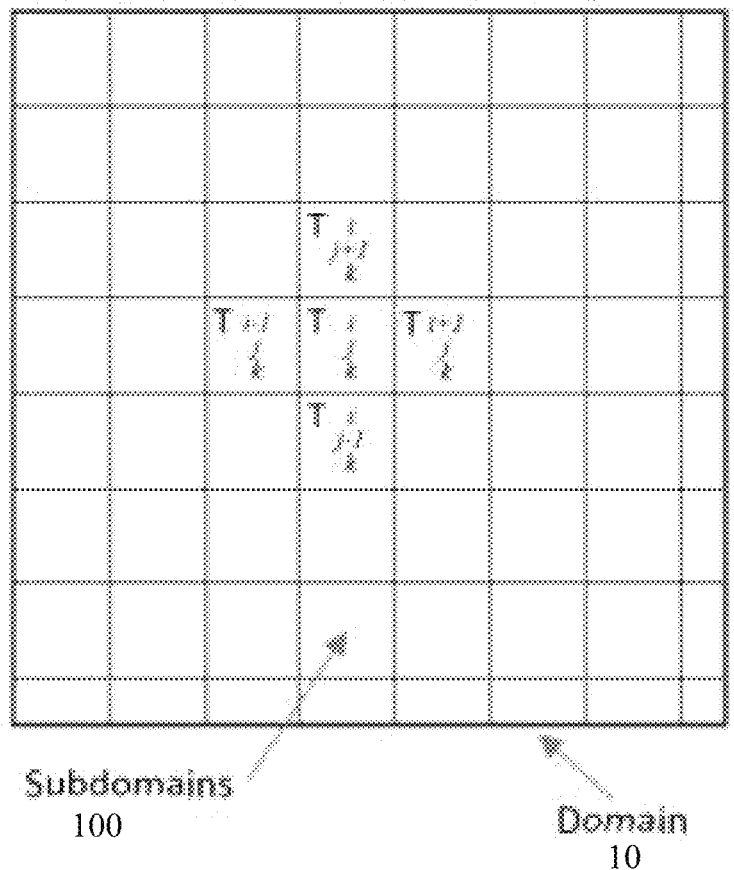
FIG. 3 schematically illustrates certain features of a scalable computation and communication method for large-scale numerical simulation in accordance with one or more embodiments of the present disclosure.
Figure 3:
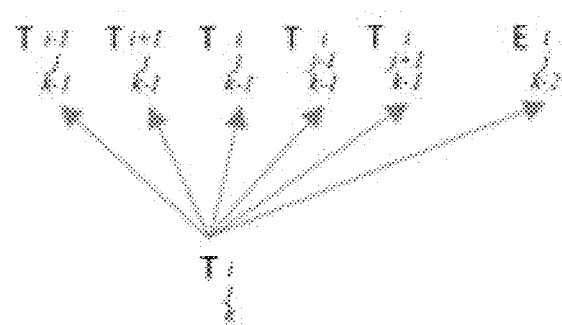

FIG. 3 provides a schematic illustration of a task dependency analysis scheme 110 of the present disclosure. As illustrated, a task T (of tasks 160 in FIG. 2) involves applying the solver over a subdomain (i,j) for a single step k in the simulation. Task dependencies are computed from a graph built according to rules specific to the simulation type (see example). In conventional systems, a task can only be attempted once neighboring tasks from the previous step and related exchange tasks (E) have been finished. The system of the present disclosure is designed to provide a continuous supply of computational work to the workers 170 in the task farm 180.

Referring again to FIG. 2, all communication between components is asynchronous, for example, via message queues 150. This prevents a delay in one part of the system from propagating across the whole simulation, and this characteristic (among others herein disclosed) leads to a highly scalable system. The exchange scheme 130 of the present disclosure handles the asynchronous exchange of information between subdomains 100 on different domains 10. This is performed individually for each subdomain 100, which avoids any synchronization at domain 10 level and creates a continuous and steady flow of data over the compute cluster network. This, in turn, minimizes contention in the network.

Figure 4:
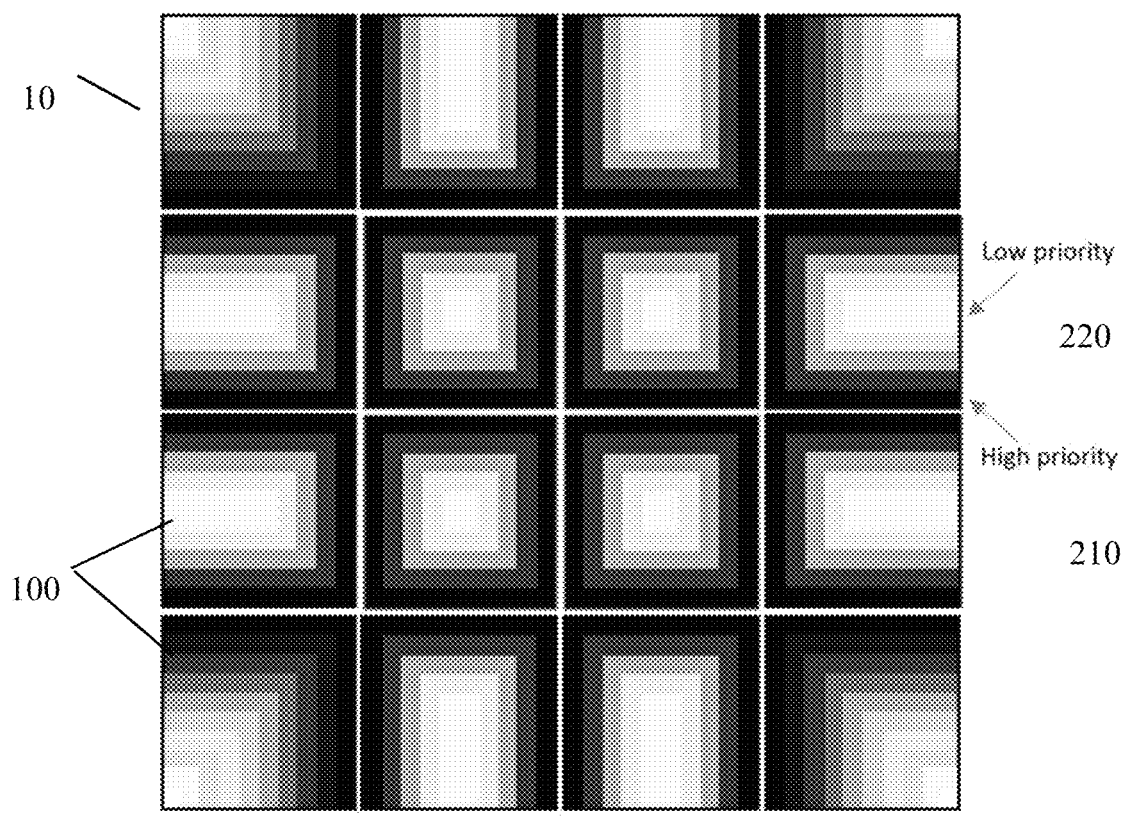
FIG. 4 illustrates an example task prioritization scheme for a regular decomposition of 4×4 domains in which tasks are prioritized according to their distance from a domain boundary in accordance with one or more embodiments of the present disclosure.

FIG. 4 depicts an example task prioritization scheme 120 for a regular 2D decomposition of a 4×4 domain 10 in a simulation, where 4×4 refers to a matrix of four domains 10 by four domains 10, in which tasks are prioritized according to their distance from a domain boundary in accordance with one or more embodiments of the present disclosure. While domain decomposition of 4×4 square 2D domain 10 is depicted, the task prioritization scheme 120 of the present disclosure is equally applicable to other (including larger and much larger) domains, irregular domains, domains with unequal numbers of subdomains in x (1D), x-y (2D) or x-y-z (3D) directions, domains that are rectangular, cubic, prismatic, irregularly shaped, and all manner of other shapes, domains with rectangular, cubic, prismatic, irregularly shaped, and all manner of other shaped subdomains, domains of varying shape or size and/or having subdomains of varying shape or size within the domain. In the example of FIG. 4, dark areas 210 indicate subdomain areas of higher priority, and light areas 220 indicate subdomain areas of lower priority, with a gradation of subdomains/priorities between. The prioritization here is applied to tasks and is based on the subdomain that each task corresponds to.

Figures 5, 5A, 5B, 5C:
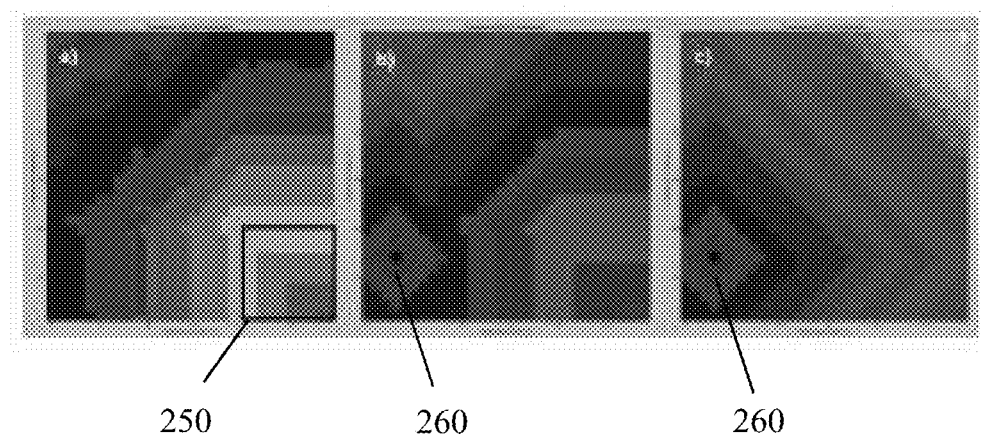
FIGS. 5A to 5C illustrate exemplary snapshots of subdomain time steps reached during evolution of a 2D simulation in accordance with one or more embodiments of the present disclosure.

FIGS. 5A to 5C illustrate exemplary snapshots of subdomain time steps reached during evolution of a simulation in accordance with one or more embodiments of the present disclosure. In this example, a numerical modelling approach of the present disclosure was implemented in 2D and 3D versions for an elastic finite-difference time-domain scheme to demonstrate scaling characteristics in cluster deployment. (The approach of the present disclosure may be implemented in 2D, 3D, and large 1D simulations.) FIGS. 5A to 5C show the time evolution of a 2D simulation with 3×3 domains, each containing 10×10 subdomains as the system responds to a series of timing changes deliberately introduced to test the flexibility of the system. At the beginning of the simulation, communication with the bottom right domain at one domain boundary 250 has been slowed down or retarded compared with the rest of the simulation (FIG. 5A). Later, a single subdomain 260 towards the bottom left is frozen. By the time of the snapshot in FIG. 5B, the simulation has begun to adapt to this, and later (FIG. 5C) all subdomains in the simulation have advanced as far as they can ahead of the frozen subdomain 260.

FIGS. 6A and 6B illustrate a comparison of exemplary performance (including scalability) results for a method in accordance with one or more embodiments of the present disclosure (FIG. 6B) and a conventional synchronized domain decomposition, in particular an optimized conventional MPI-based approach that computes updates for an entire domain, exchanging halos at the end of each step (FIG. 6A). The kernels tested were identical CPU-based implementations of a 3D elastic velocity-stress finite-difference scheme built with chip-specific optimizations tailored for the cluster used for testing, which consisted of Intel Broadwell-EP blades connected with an Infiniband network. The jobs that generated these timings were all submitted to this cluster simultaneously, intermingled with (and therefore contending with) each other and additional unrelated workloads. FIG. 6A includes performance measurements 310, a best-fit curve from the Universal Scalability Law 320, and a linear scaling curve 330. FIG. 6B includes performance measurements 410, a best-fit curve from the Universal Scalability Law 420, and a linear scaling curve 430. With the Universal Scalability Law given as $C_p(\sigma, \kappa) = p/[1+\sigma(p-1)+\kappa p(p-1)]$, the scaling curves 320, 420 in FIGS. 6A and 6B are based on a least-squares fit of the Universal Scalability Law to the data and extrapolated to predict the expected behavior for a further doubling of resources. The timings for the conventional, synchronized approach (FIG. 6A) show a large variance and appear to follow a scaling curve dominated by incoherency that is close to its maximum performance level within the measured range. The timings for the asynchronous approach of the present disclosure (FIG. 6B) follow a curve that is close to linear scaling i.e. with a significantly improved performance level over the conventional synchronized approach. These performance figures illustrate a significant uplift in scalability in a particular scenario but these figures are not intended and should not be interpreted to represent the limit of the possible gain.

The systems and methods of the present disclosure are applicable to any numerical modelling that can distributed using axis-aligned domain decomposition, regardless of geometrical structure. While the previously described tested implementation uses a finite-difference time domain (FDTD) approach to solving the elastic wave equation, the equations solved during the numerical modelling can be changed to solve a wide range of problems, and the present disclosure applied to any other scheme solving a problem that can be decomposed into domains, subdomains, and solution steps as described above.

Reference throughout this specification to "one embodiment," "an embodiment," or similar language means that a particular feature, structure, or characteristic described in connection with the embodiment may be included in at least one embodiment of the present disclosure. Thus, appearances of the phrases "in one embodiment," "in an embodiment," and similar language throughout this specification may, but do not necessarily, all refer to the same embodiment.

Although the present disclosure has been described with respect to specific details, it is not intended that such details should be regarded as limitations on the scope of the invention, except to the extent that they are included in the accompanying claims.

What is claimed is:

1. A method for modeling of a multi-dimensional problem domain in a computer simulation, the method comprising:
    modeling the problem domain into a plurality of multi-dimensional domains, each domain neighboring at least one other domain and sharing a border with the neighboring domain, each domain of the plurality of domains being associated with different discrete hardware computing units of a computing cluster, and wherein each domain of the plurality of domains comprises a plurality of subdomains associated with respective sub-units of the discrete hardware computing units associated with that domain, the plurality of subdomains including a subset of subdomains along the shared border with the neighboring domain that each have at least one corresponding neighboring subdomain in the neighboring domain;
    defining a worker to represent each sub-unit of the discrete hardware computing units;
    defining computational tasks to represent units of numerical computation in the computer simulation, each unit of numerical computation corresponding to processing one subdomain of the plurality of subdomains for one simulation time step;
    defining a subset of the computational tasks that are available and are waiting to be processed;
    determining an order in which the available computational tasks at any given time should be processed and assigning the available computational tasks to workers asynchronously;
    processing the available computational tasks by the workers using the sub-units of the discrete hardware computing units in the determined order to produce results;
    defining exchanges of halos of information between neighboring domains including exchange actions that exchange the information asynchronously between corresponding neighboring subdomains across borders of the neighboring domains, wherein the information of a given halo includes a result of processing a computational task of a given subdomain that is required to process the computational task of a corresponding neighboring subdomain for a next time step; and performing the exchange actions to exchange the information between the corresponding neighboring subdomains to advance subdomains of a given domain by one time step asynchronously with respect to the subdomains of the neighboring domain.

2. The method of claim 1, wherein in the computer simulation is for a 2D or higher-dimensional system.

3. The method of claim 1, wherein in the computer simulation is for a seismic survey.

4. The method of claim 1, wherein the exchange actions are defined via message queues.

5. The method of claim 1, wherein the discrete hardware computing units include a plurality of computing blades of a computing cluster.

6. The method of claim 1, wherein the subset of subdomains includes subdomains from the plurality of subdomains on a boundary between the domain and the different domain.

7. A method for multi-dimensional domain modeling for a large-scale numerical computer simulation, the method comprising:
    modeling a computer simulation into a plurality of multi-dimensional domains, each domain neighboring at least one other domain and sharing a border with the neighboring domain, each domain being associated with different discrete hardware computing units of a computing cluster, and wherein each domain of the plurality of domains comprises a plurality of subdomains associated with respective sub-units of the discrete hardware computing units associated with that domain, the plurality of subdomains including a subset of subdomains along the shared border that each have at least one corresponding neighboring subdomain in the neighboring domain;
    prioritizing tasks for computation, the tasks representing units of numerical computation in the computer simulation, each unit of numerical computation corresponding to processing one subdomain of the plurality of subdomains for one simulation time step;
    evaluating availability of the tasks for computation within the plurality of subdomains;
    processing each available tasks using the sub-units of the discrete hardware computing units corresponding to the subdomain represented by the task according to the priority to produce results;
    defining exchanges of halo of information between neighboring domains of the plurality of domains including exchange actions that exchange the information asynchronously between corresponding neighboring subdomains across borders of the neighboring domains, wherein the information of a given halo includes results of processing a computational task of a given subdomain that is required to process the computational task of a corresponding neighboring subdomain for a simulation next time step; and
    performing the exchange actions to exchange the halo information between the corresponding neighboring to advance subdomains of a given domain by one simulation time step asynchronously with respect to other subdomains of the neighboring domain.

8. The method of claim 7, wherein modeling the computing simulation into the plurality of domains comprises:
    mapping the plurality of domains to computer blades connected with a computational resource for computation.

9. The method of claim 7, wherein the computational resource is a GPU or a CPU.

10. The method of claim 7, wherein exchanging the halo between the two or more domains includes asynchronous communication across boundaries of the two or more domains in packets exchanged between the subdomain and the neighboring subdomain.

11. The method of claim 7, wherein exchanging the halo is steady and continuous.

12. The method of claim 1, wherein the halo is one of a plurality of halos, and wherein the method includes exchanging the plurality of halos across domain boundaries.

13. The method of claim 12, wherein exchanging the plurality of halos includes causing exchanges of halos between neighboring subdomains of the plurality of subdomains in different domains.

14. The method of claim 1, different areas within each subdomain of the plurality of subdomains being prioritized into areas of differing levels of priority based on distances from a boundary between adjacent domains.

15. The method of claim 1, wherein each assigned task that is assigned asynchronously represents a unit of computation within a single subdomain, as a solution of the single step in a time-stepping scheme.

* * * * *